United States Patent
Gupta et al.

(10) Patent No.: US 10,430,104 B2
(45) Date of Patent: Oct. 1, 2019

(54) DISTRIBUTING DATA BY SUCCESSIVE SPATIAL PARTITIONINGS

(71) Applicant: INTERNATIONAL BUSINESS MACHINES CORPORATION, Armonk, NY (US)

(72) Inventors: Aayush Gupta, San Jose, CA (US); Sangeetha Seshadri, San Jose, CA (US); Abdurrahman Yasar, Smyrna, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 15/589,339

(22) Filed: May 8, 2017

(65) Prior Publication Data

US 2018/0321869 A1    Nov. 8, 2018

(51) Int. Cl.
G06F 3/06    (2006.01)

(52) U.S. Cl.
CPC .......... *G06F 3/0644* (2013.01); *G06F 3/0604* (2013.01); *G06F 3/0688* (2013.01); *G06F 3/0689* (2013.01)

(58) Field of Classification Search
CPC .... G06F 3/0644; G06F 3/0689; G06F 3/0604; G06F 3/0688
See application file for complete search history.

(56) References Cited

U.S. PATENT DOCUMENTS

| 6,154,746 A | 11/2000 | Berchtold et al. |
| 6,437,804 B1 | 8/2002 | Ibe et al. |
| 8,219,564 B1 | 7/2012 | Shao et al. |
| 2013/0039423 A1 | 2/2013 | Helle et al. |
| 2014/0297585 A1* | 10/2014 | Chawda ............ G06F 17/30584 707/610 |
| 2015/0081203 A1 | 3/2015 | Tesov |
| 2015/0350324 A1* | 12/2015 | Hu ..................... G06F 17/30867 709/219 |
| 2017/0168990 A1* | 6/2017 | Kernert ................... G06F 17/16 |

OTHER PUBLICATIONS

Boman et al., Scalable matrix computations on large scale-free graphs using 2D graph partitioning; In Proceedings of the International Conference on High Performance Computing, Networking, Storage and Analysis (2013), Article 50, 12 pages, ACM, New York, NY, USA.

Xiang et al., Scalable maximum clique computation using MapReduce. In Proceedings of the 2013 IEEE International Conference on Data Engineering (2013), 74-85, IEEE Computer Society, Washington, DC, USA.

(Continued)

*Primary Examiner* — Tasnima Matin
(74) *Attorney, Agent, or Firm* — Allen, Dyer, Doppelt + Gilchrist, P.A.

(57) ABSTRACT

A computer-implemented method for distributing data among memory devices may include performing successive spatial partitionings of a graph of data based upon vertices and associated edges to generate spatial partitions with each spatial partition having a respective number of edges below a threshold. The method may also include ordering the spatial partitions and distributing the spatial partitions among the memory devices based upon the ordering.

20 Claims, 8 Drawing Sheets

(56) References Cited

OTHER PUBLICATIONS

Zhou et al., Fast Iterative Graph Computation with Resource Aware Graph Parallel Abstractions; HPDC'15, Jun. 15-20, 2015, Portland, Oregon, USA.
Kyrola et al., GraphChi: Large-Scale Graph Computation on Just a PC, 2012.
Zheng et al., FlashGraph: Processing Billion-Node Graphs on an Array of Commodity SSDs, In Proceedings of the 13th USENIX Conference on File and Storage Technologies; Feb. 16-19, 2015, 15 pages, Santa Clara, CA, USA.
Yan et al., Blogel: A BlockCentric Framework for Distributed Computation on Real-World Graphs, In the Proceedings of the 40th International Conference on Very Large Data Bases, Sep. 1, 5, 2014, pp. 1981-1992, Hangzhou, China.
Gonzalez et al., PowerGraph: Distributed Graph-Parallel Computation on Natural Graphs, USENIX Association, In the Proceedings of the 10th Usenix Symposium on Operating Systems Design and Implementation (OSDI '12).
Malewicz et al., Pregel: A System for Large-Scale Graph Processing, SIGMOD'10, Jun. 6-11, 2010, pp. 135-145, Indianapolis, Indiana, USA.
Wikipedia, Branch and bound, https://en.wikipedia.org/wiki/Branch_and_bound.

* cited by examiner

DISTRIBUTING DATA BY SUCCESSIVE SPATIAL PARTITIONINGS

BACKGROUND

The present invention relates to computer systems, and more specifically, to partitioning and related methods.

A partition may be one or more regions on a memory, for example, a hard drive, that appear as a logical partition where information may be stored. Each logical partition may appear as a separate memory to an operating system, for example. In a database, a partition is a division of a logical database into distinct independent parts, for example, to increase read or write speeds. Each database partition may span over several memories.

SUMMARY

A computer-implemented method for distributing data among a plurality of memory devices may include performing a plurality of successive spatial partitionings of a graph of data based upon vertices and associated edges to generate a plurality of spatial partitions with each spatial partition having a respective number of edges below a threshold. The method may also include ordering the plurality of spatial partitions and distributing the plurality of spatial partitions among the plurality of memory devices based upon the ordering.

The method may also include generating an index based upon the plurality of spatial partitions and associated vertices. The plurality of successive partitionings may include performing a plurality of successive quad tree partitionings, for example.

The ordering may be based upon a Hilbert curve, for example. The graph may include a dynamic graph. The plurality of memory devices may include a plurality of magnetic media, for example. The plurality of memory devices may include a plurality of solid-state memory devices.

Another aspect is directed to a computer system for distributing data. The computer system may include a plurality of memory devices and a processor coupled to the plurality of memory devices. The processor may be configured to perform a plurality of successive spatial partitionings of a graph of data based upon vertices and associated edges to generate a plurality of spatial partitions with each spatial partition having a respective number of edges below a threshold and order the plurality of spatial partitions. The processor may also be configured to distribute the plurality of spatial partitions among the plurality of memory devices based upon the ordering.

Another aspect is directed to a computer-readable medium for distributing data among a plurality of memory devices. The computer-readable medium includes computer executable instructions that when executed by a processor cause the processor to perform operations that may include performing a plurality of successive spatial partitionings of a graph of data based upon vertices and associated edges to generate a plurality of spatial partitions with each spatial partition having a respective number of edges below a threshold. The operations may also include ordering the plurality of spatial partitions and distributing the plurality of spatial partitions among the plurality of memory devices based upon the ordering.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
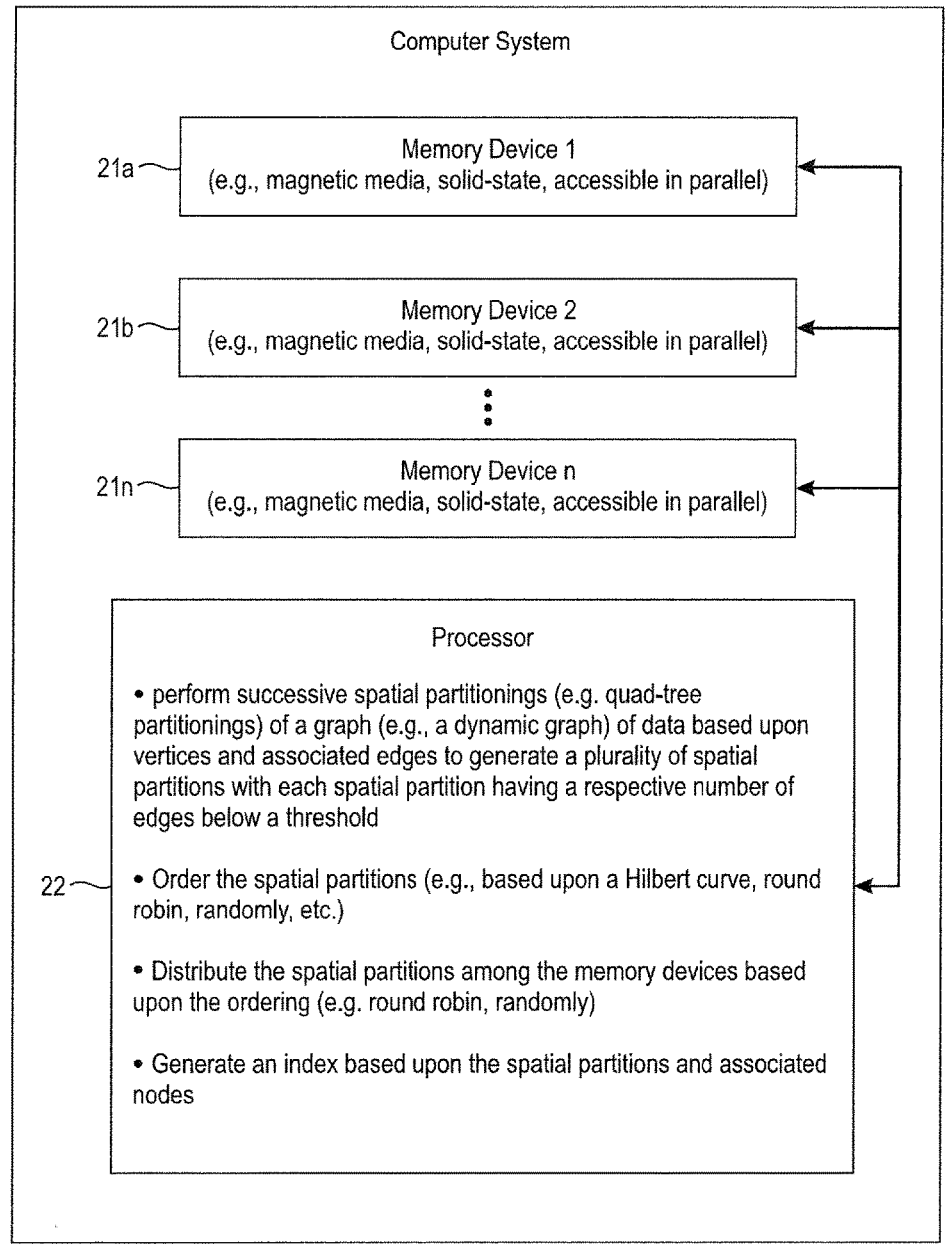
FIG. 1 is a schematic block diagram of a computer system according to an embodiment.

Referring initially to FIG. 1, a computer system 20 for distributing data. The computer system 20 includes memory devices 21a-21n. The memory devices 21a-21n may be magnetic media storage devices, for example, hard drives, and/or solid state memory devices. Of course the memory devices 21a-21n may be other types of memory devices and/or each of the memory devices may be different types of memory. The memory devices 21a-21n may be accessible, for example, reading and writing, in parallel.

A processor 22 is coupled to the memory devices 21a-21n. While a processor 22 is described, it will be appreciated by those skilled in the art that a processor may be a controller, processor, and/or other circuitry that performs the functions described herein. The processor 22 may be embodied in one or more physical circuits, for example, integrated circuits.

Figure 2:
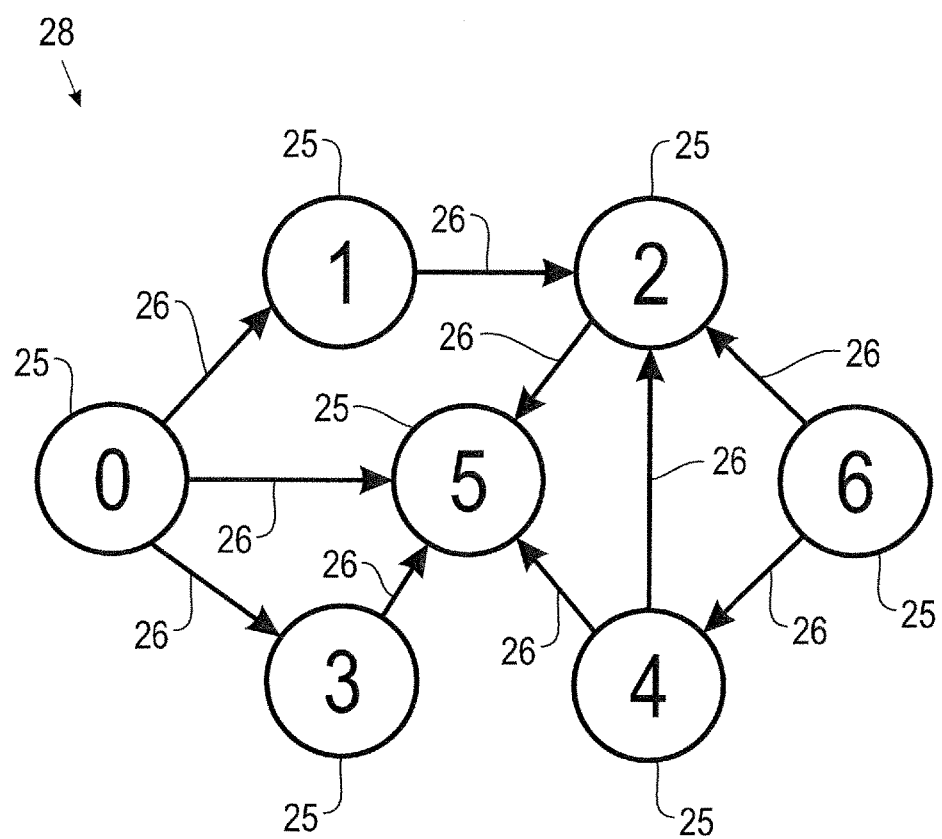
FIG. 2 is a directed vertex-edge graph.
Figure 3:
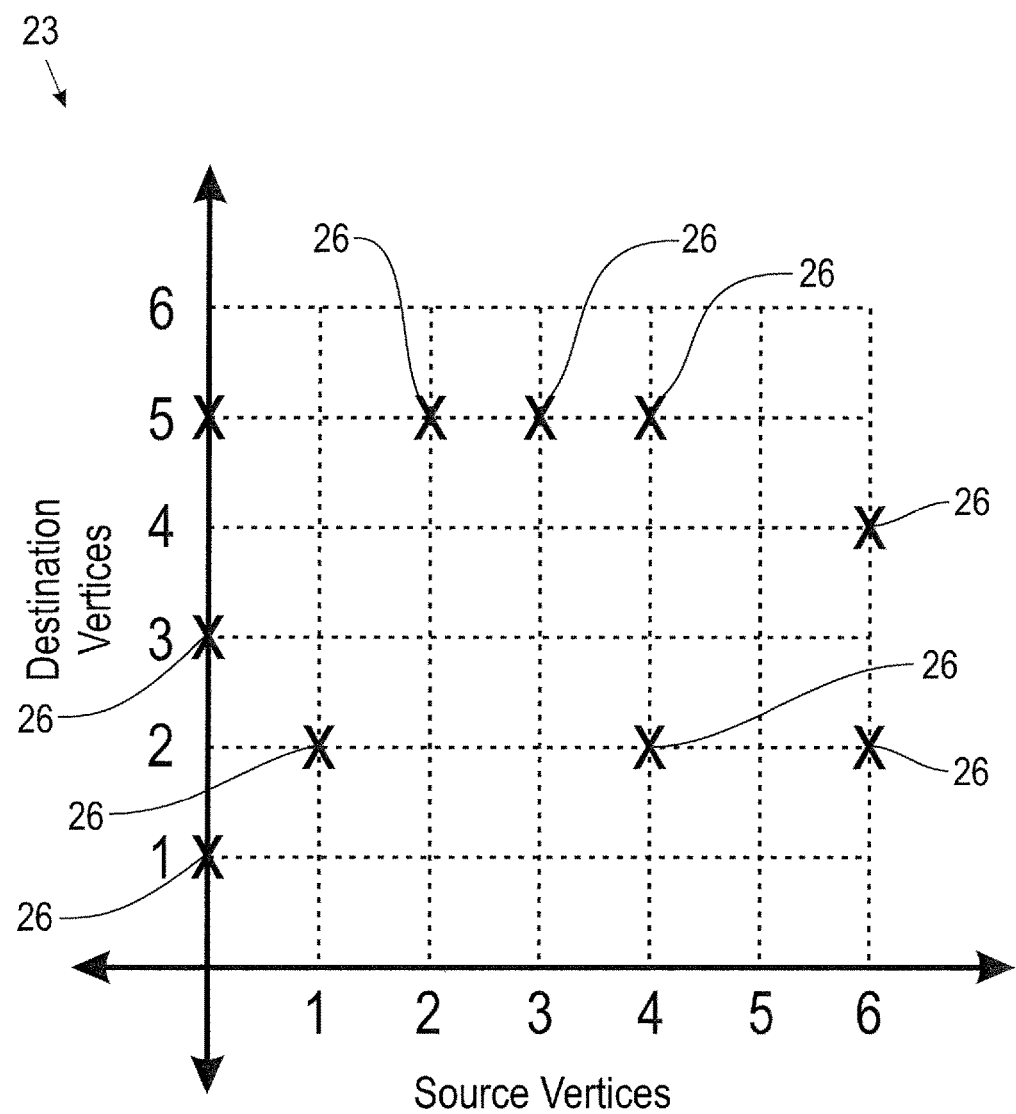
FIG. 3 is a directed vertex-edge coordinate system graph.
Figure 8:
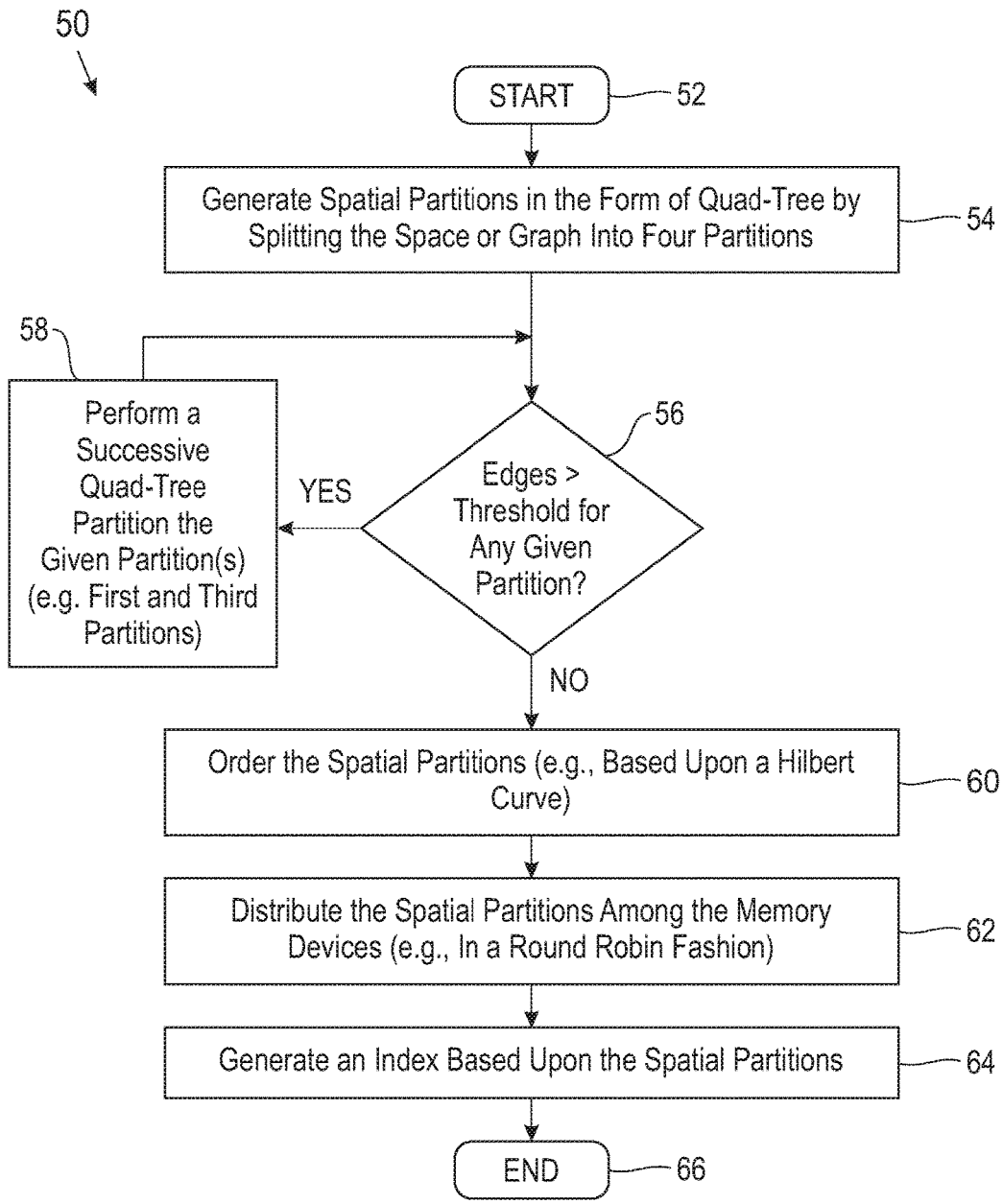
FIG. 8 is a flowchart illustrating a method of distributing data according to an embodiment.

Referring now additionally to FIGS. 2 and 3, and the flowchart 50 in FIG. 8, operation of the processor 22 to distribute data will now be described. While several data points, i.e. vertices, are described and illustrated as exemplary data to be distributed, it should be appreciated by those skilled in the art that billions of data points or vertices may be distributed according to the embodiments described herein.

A two-dimensional (2D) graphical representation of the data is illustrated in FIGS. 2 and 3. The 2D graphical representation 28 includes nodes or vertices 25 representing source and destination vertices. Edges 26 connect the vertices. Illustratively, the edges 26 of the graph are represented by a 2D plane or graph 23 (FIG. 3) where the x-axis is the source vertices and the y-axis is the destination vertices, and the edges are indicated by an "x." The graph 23 may be a dynamic graph, for example, may be a graph whereby edges or vertices are added or removed on an ongoing basis, e.g. adding or removing a friend on social media in a social network graph.

Figure 4:
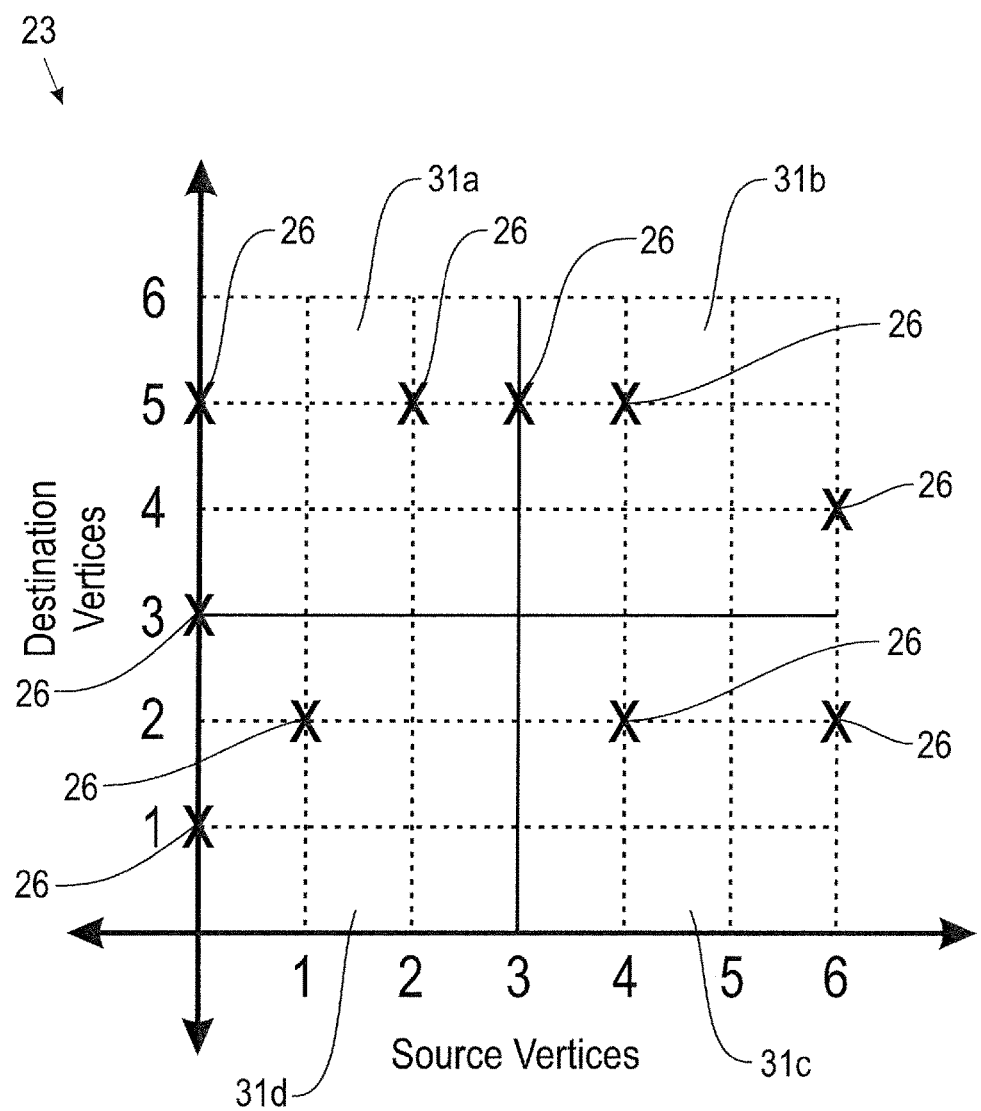
FIG. 4 is the vertex-edge coordinate system graph of FIG. 3 after a first successive partitioning according to an embodiment.

Referring additionally to FIG. 4, and beginning at Block 52 (FIG. 8), the processor 22 performs successive spatial partitionings of the graph 23 of data based upon vertices and associated edges to generate final spatial partitions 31b, 31c, 32a-32d, 33a-33d (shown in FIG. 6) with each spatial partition having a respective number of edges 26 below a threshold. In an exemplary embodiment, spatial partitions, which are shown by the solid line, are generated in the form of a quad tree by splitting the space or graph 23 into four partitions 31a-31d (Block 54) (FIG. 8). A quad tree is a form of a spatial index, as will be appreciated by those skilled in the art. The four partitions 31a-31d are illustratively equal in size, but it should be understood that the partitions may not be equal in size. Other partitioning techniques may be used, for example, KD tree, octree, and r-tree.

A desired threshold number of edges in a given partition 31a-31d may be predetermined. In the exemplary embodiment, for ease of explanation, the desired threshold is set to two. However, it will be appreciated the threshold may be set to any number, and when referring to billions of data points, the threshold number may be set to be relatively high.

Figure 5:
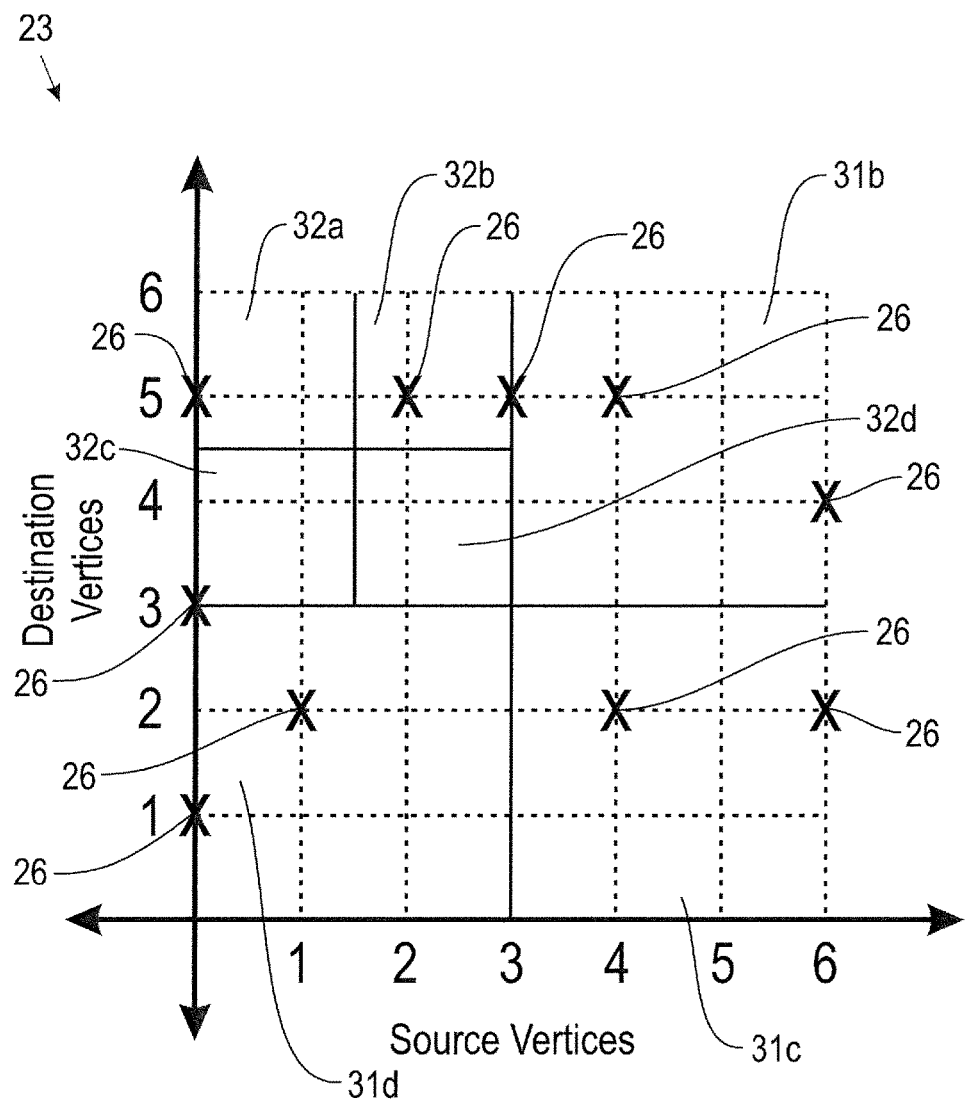
FIG. 5 is the vertex-edge coordinate system graph of FIG. 4 after a second successive partitioning according to an embodiment.
Figure 6:
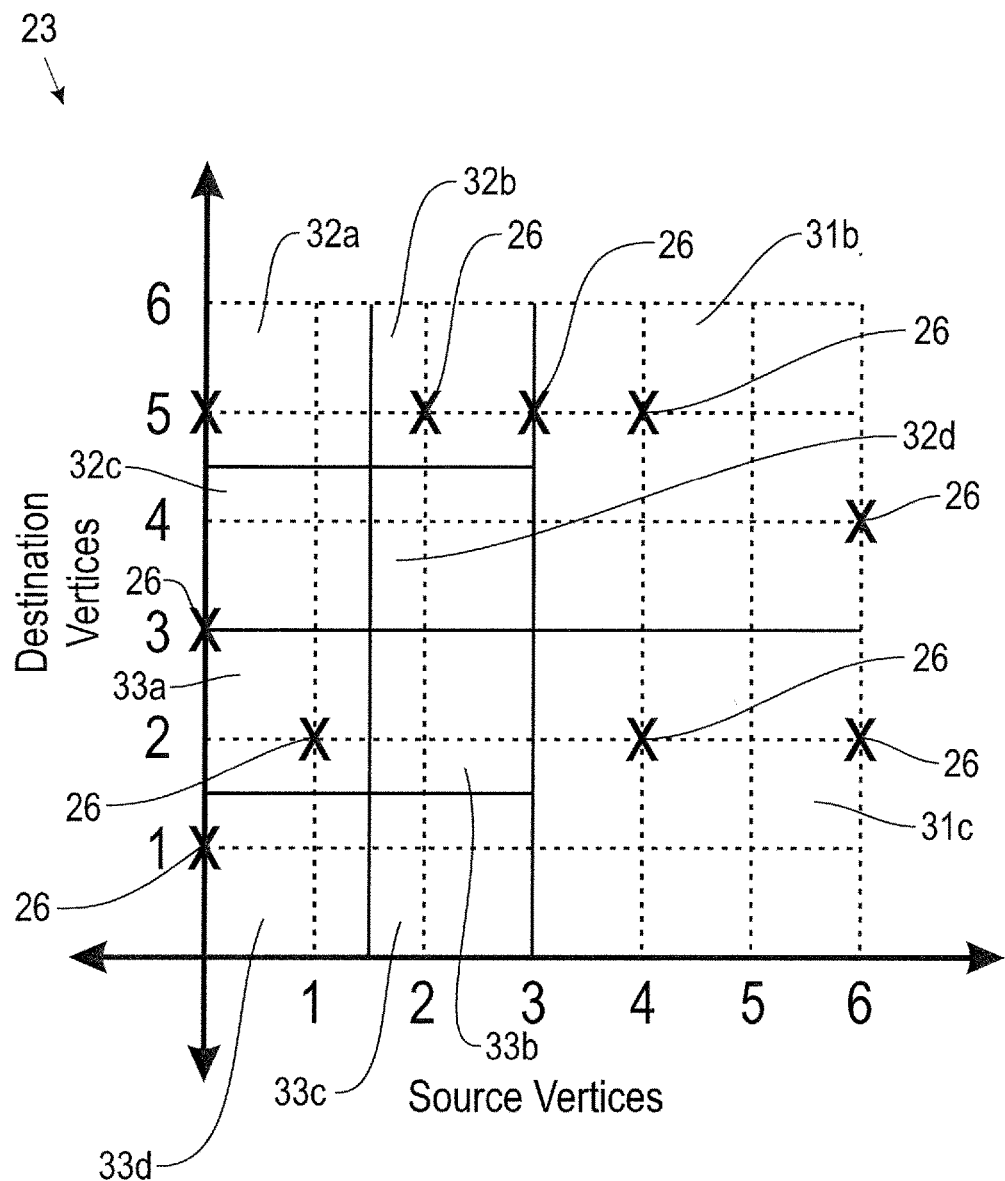
FIG. 6 is the vertex-edge coordinate system graph of FIG. 5 after a third successive partitioning according to an embodiment.

Referring additionally to FIGS. 5 and 6 the next successive spatial partitioning is performed on the first partition 31a (FIG. 5), and the fourth partition 32d (FIG. 6), as each partition has more than two edges 26 (as determined at Block 56). More particularly, a quad tree partitioning is applied to the first and third partitions 31a, 31c (Blocks 58) by splitting each respective partition into four smaller partitions 32a-32d, 33a-33d. Edges 26 appearing on a border between adjacent partitions 31a-31d may be placed in either of the adjacent partitions. At this point, the partitioning is complete, as all the partitions have a threshold number or less (i.e., 2) edges therein (Block 56). In particular, in the present example, there are six partitions, two of which have one edge and four of which have two edges.

Figure 7:
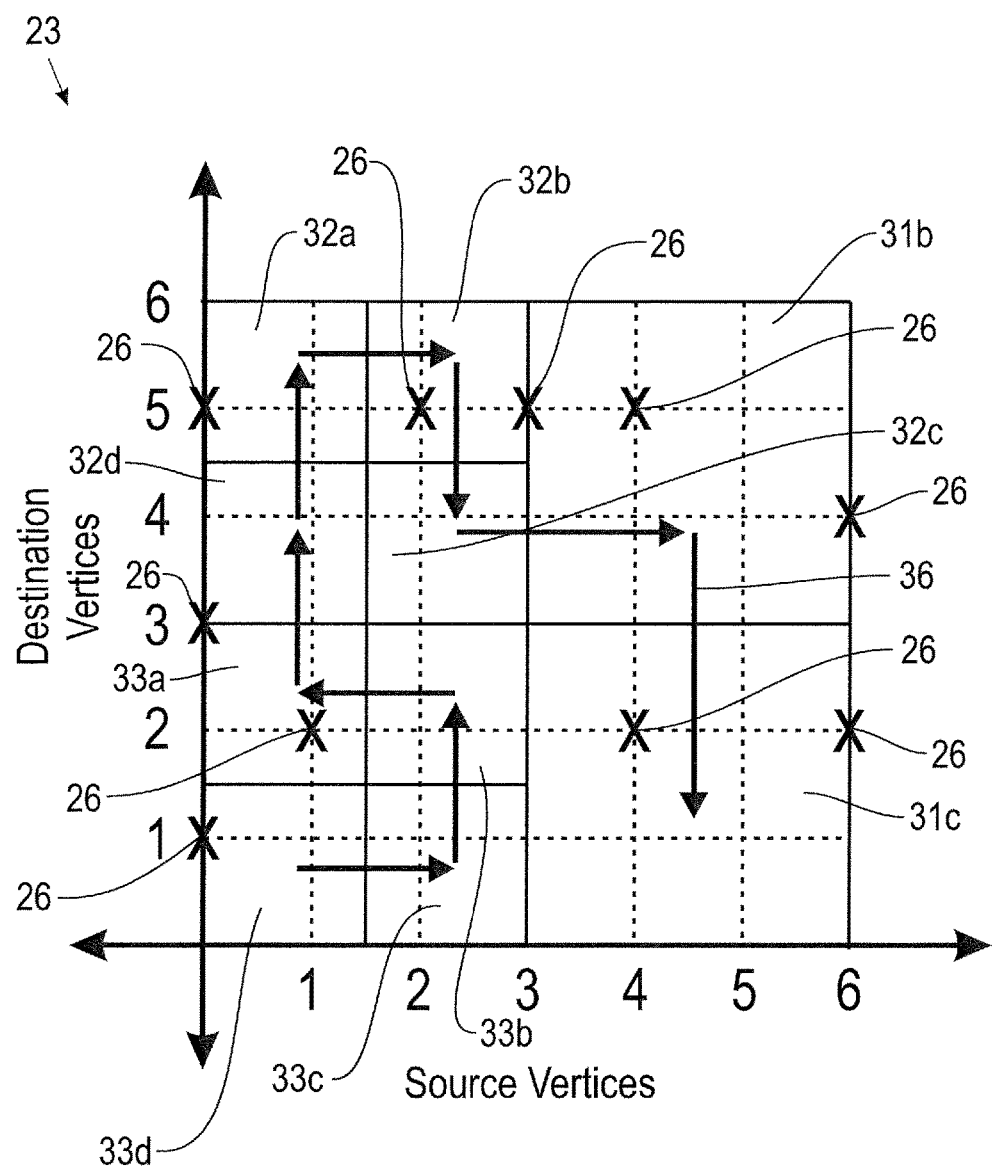
FIG. 7 is a vertex-edge coordinate system graph of FIG. 6 after ordering according to an embodiment.

Referring additionally to FIG. 7, and Block 60, the processor 22 orders the spatial partitions 31c, 31d, 32a-32d, 33a-33d. In particular, the spatial partitions 31c, 31d, 32a-32d, 33a-33d are ordered based upon a Hilbert curve 36, for example, which, as will be appreciated by those skilled in the art, provides spatial distribution. For example, the spatial partitions may be ordered as follows: 33d, 33c, 33b, 33a, 32d, 32a, 32b, 32c, 31b, 31c. Of course, the processor 22 may order the spatial partitions 31c, 31d, 32a-32d, 33a-33d based upon other and/or additional ordering techniques, for example, sequentially, randomly, round-robin, etc.

The processor 22 distributes the spatial partitions 31c, 31d, 32a-32d, 33a-33d among the memory devices 21a-21n, for example, writing, based upon the ordering (Block 62). Illustratively, the processor 22 distributes the spatial partitions 31c, 31d, 32a-32d, 33a-33d in a round-robin fashion based upon the generated Hilbert curve to the memory devices (e.g., where there are three memory devices, 33d→21a, 33a→21b, 32a→21c, 32b→21a, 31b→21b, 31c→21c). Partitions without data (i.e., 33c, 33b, 32d, 32c) are not distributed or written to the memory devices 21a-21n as there is no data to distribute. The processor 22 may distribute the spatial partitions 31a-31d, 32a-32d, 33a-33d among the memory devices 21a-21n based upon other and/or additional distribution methods or techniques, for example, based upon semantics of workload.

An exemplary bulk-load algorithm operated by the processor 22 for distributing the graph data among the memory devices 21a-21n based upon the described spatial partitioning is described below.

```
Data: M argmax(V), S ← size
q create_qtree( M, √S x α);        //Leaf range is √S x α
```

-continued

```
for ∀e ∈ E do
    q.insert(e);            // Count edges per leaf
end
q.balance(S);               // Prune after reaching S
for ∀e ∈ E do
    p ← q.find(e);          // Find location of e
    p.write(e);             // Write e to that partition
end
for ∀p ∈ P do
    sort(p);                // Read, sort & rewrite p
end
```

In some embodiments, at Block 64, the processor 22 may generate an index based upon the spatial partitions 31c, 31d, 32a-32d, 33a-33d and associated vertices 25. The method ends at Block 66.

As will be appreciated by those skilled in the art, grid based partitioning of graphs may result in unbalanced input/output (I/O) and memory utilization. The complexity of sorting including pre-processing times typically increases with the size of a graph. As a graph evolves, it may be desirable that the layout of the graph be capable of performing relatively fast updates or delete operations of the edges or vertices. Unbalanced partitions may result in unpredictable memory and I/O utilization. Thus, to increase resource utilization, balanced sized partitions are desired. Moreover, it may be desirable that sub-graph processing be supported for some types of graph algorithms that access a portion of the graph.

The present embodiments may advantageously provide balanced read/write operations, as partitions are not skewed. Moreover, the present embodiments may provide faster pre-processing time, as a complete sorting of an edge list is not being performed. Instead, the smaller partitions are sorted. With respect to dynamic graphs, the present embodiments provide increased efficiency in adding and/or removing edges or vertices. Other prior art graph processing systems typically require re-processing of data when an edge or vertex is removed or added.

The present embodiments provide sub-graph computation, and an index for both partitions and vertices. In other words, which partition is stored on which disk is known instead of which vertex is on which partition, thus resulting in a reduced index size.

Another aspect is directed to a computer-readable medium for distributing data among a plurality of memory devices 21a-21n. The computer-readable medium includes computer executable instructions that when executed by a processor 22 cause the processor to perform operations that include performing a plurality of successive spatial partitionings of a graph of data 23 based upon vertices 25 and associated edges 26 to generate a plurality of spatial partitions 31c, 31d, 32a-32d, 33a-33d with each spatial partition having a respective number of edges below a threshold. The operations also include ordering the plurality of spatial partitions 31c, 31d, 32a-32d, 33a-33d and distributing the plurality of spatial partitions among the plurality of memory devices 21a-21n based upon the ordering.

It should be understood by those skilled in the art that a graph, as described herein, may include both directed and undirected graphs. In other words, while the embodiments described herein are with respect to a directed graph, the method and system is also applicable to an undirected graph by replacing an un-directed edge between, for example, vertices by way of two directed edges.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributing data among a plurality of memory devices comprising:
   performing a plurality of successive spatial partitionings of a two-dimensional (2D) graphical representation of data based upon vertices and associated edges by at least
      splitting the 2D graphical representation into a plurality of spatial partitions, each spatial partition having a respective edge threshold associated therewith,
      determining a number of respective edges within each spatial partition of the plurality thereof, wherein edges appearing on a border of adjacent spatial partitions are determined to be associated with the spatial partition having a lower number of determined edges, and
      for each spatial partition having a number of edges more than the respective edge threshold, successively splitting the associated spatial partition until each of the plurality of spatial partitions has less than the respective edge threshold;
   ordering the plurality of spatial partitions;
   determining which of the ordered plurality of spatial partitions has data therein;
   determining a respective workload for each of the plurality of memory devices; and
   distributing ones of the plurality of spatial partitions having data among the plurality of memory devices based upon the ordering and the determined workload.

2. The computer-implemented method of claim 1 further comprising generating an index based upon the plurality of spatial partitions and associated vertices.

3. The computer-implemented method of claim 1 wherein performing the plurality of successive partitionings comprises performing a plurality of successive quad tree partitionings.

4. The computer-implemented method of claim 1 wherein the ordering is based upon a Hilbert curve.

5. The computer-implemented method of claim 1 wherein the 2D graphical representation comprises a dynamic 2D graphical representation.

6. The computer-implemented method of claim 1 wherein the plurality of memory devices comprises a plurality of magnetic media.

7. The computer-implemented method of claim 1 wherein the plurality of memory devices comprises a plurality of solid-state memory devices.

8. A computer system for distributing data comprising:
   a plurality of memory devices; and
   a processor coupled to the plurality of memory devices and configured to
   perform a plurality of successive spatial partitionings of a two-dimensional (2D) graphical representation by at least
      splitting the 2D graphical representation into a plurality of spatial partitions, each spatial partition having a respective edge threshold associated therewith,
      determining a number of respective edges within each spatial partition of the plurality thereof, wherein edges appearing on a border of adjacent spatial partitions are determined to be associated with the spatial partition having a lower number of determined edges, and
      for each spatial partition having a number of edges more than the respective edge threshold, successively splitting the associated spatial partition until each of the plurality of spatial partitions has less than the respective edge threshold of data based upon vertices and associated edges,
   order the plurality of spatial partitions,
   determine which of the ordered plurality of spatial partitions has data therein,
   determine a respective workload for each of the plurality of memory devices, and
   distribute ones of the plurality of spatial partitions having data among the plurality of memory devices based upon the ordering and the determined workload.

9. The computer system of claim 8 wherein the processor is configured to generate an index based upon the plurality of spatial partitions and associated vertices.

10. The computer system of claim 8 wherein the processor is configured to perform the plurality of successive partitionings by performing a plurality of successive quad tree partitionings.

11. The computer system of claim 8 wherein the processor is configured to order based upon a Hilbert curve.

12. The computer system of claim 8 wherein the 2D graphical representation comprises a dynamic 2D graphical representation.

13. The computer system of claim 8 wherein the plurality of memory devices comprises a plurality of magnetic media.

14. The computer system of claim 8 wherein the plurality of memory devices comprises a plurality of solid-state memory devices.

15. The computer system of claim 8 wherein the plurality of memory devices are configured to be accessible in parallel.

16. A non-transitory computer-readable medium for distributing data among a plurality of memory devices, the computer-readable medium comprising computer executable instructions that when executed by a processor cause the processor to perform operations comprising:
   performing a plurality of successive spatial partitionings of a two-dimensional (2D) graphical representation of data based upon vertices and associated edges by at least
      splitting the 2D graphical representation into a plurality of spatial partitions, each spatial partition having a respective edge threshold associated therewith,
      determining a number of respective edges within each spatial partition of the plurality thereof, wherein edges appearing on a border of adjacent spatial partitions are determined to be associated with the spatial partition having a lower number of determined edges, and
      for each spatial partition having a number of edges more than the respective edge threshold, successively splitting the associated spatial partition until each of the plurality of spatial partitions has less than the respective edge threshold;
   ordering the plurality of spatial partitions;
   determining which of the ordered plurality of spatial partitions has data therein;
   determining a respective workload for each of the plurality of memory devices; and distributing ones of the plurality of spatial partitions having data among the plurality of memory devices based upon the ordering and the determined workload.

17. The non-transitory computer-readable medium of claim 16 wherein the computer-executable instructions cause the processor to generate an index based upon the plurality of spatial partitions and associated vertices.

18. The non-transitory computer-readable medium of claim 16 wherein performing the plurality of successive partitionings comprises performing a plurality of successive quad tree partitionings.

19. The non-transitory computer-readable medium of claim 16 wherein the ordering is based upon a Hilbert curve.

20. The non-transitory computer-readable medium of claim 16 wherein the 2D graphical representation comprises a dynamic 2D graphical representation.

* * * * *